(12) United States Patent
Barnes

(10) Patent No.: US 6,951,633 B1
(45) Date of Patent: *Oct. 4, 2005

(54) HYBRID OZONE GENERATOR

(76) Inventor: Ronald L. Barnes, 3122 12th Ave. SW., Huntsville, AL (US) 35805

( * ) Notice: Subject to any disclaimer, the term of this patent is extended or adjusted under 35 U.S.C. 154(b) by 334 days.

This patent is subject to a terminal disclaimer.

(21) Appl. No.: 10/208,897

(22) Filed: Jul. 30, 2002

Related U.S. Application Data

(63) Continuation-in-part of application No. 09/717,904, filed on Nov. 20, 2000, now Pat. No. 6,426,053.

(60) Provisional application No. 60/166,255, filed on Nov. 18, 1999.

(51) Int. Cl.[7] .............................................. B01J 19/08
(52) U.S. Cl. ............................ 422/186.3; 422/186.12; 422/186.07
(58) Field of Search .................... 422/186.12, 186.07, 422/186.3

(56) References Cited

U.S. PATENT DOCUMENTS 5,474,748 A * 12/1995 Szabo .................... 422/186.04
5,935,431 A *  8/1999 Korin ........................ 210/205
6,426,053 B1 *  7/2002 Barnes .................... 422/186.3

* cited by examiner

Primary Examiner—Kishor Mayekar
(74) Attorney, Agent, or Firm—Mark Clodfelter

(57) ABSTRACT

An ozone generator utilizing an ultraviolet light tube for generating ozone is disclosed. In this ozone generator, efficiency in converting oxygen to ozone is increased by imposing an electrical field around the light tube. This electrical field causes a theta pinch in the plasma of the light tube, increasing luminescence in the ultraviolet spectral range and exciting diatomic oxygen molecules passing through the electrical field. Thus excited, the diatomic oxygen is easier to disassociate and become converted to ozone.

16 Claims, 7 Drawing Sheets

US 6,951,633 B1

HYBRID OZONE GENERATOR

CROSS REFERENCE TO RELATED APPLICATIONS

This application is a continuation-in-part of patent application Ser. No. 09/717,904, filed Nov. 20, 2000, now U.S. Pat. No. 6,426,053, and which claims the benefit of provisional application No. 60/166,255, filed Nov. 18, 1999.

FIELD OF THE INVENTION

This invention relates to ozone generators, and particularly to an ozone generator using a hot cathode tube wherein efficiency of the generator is increased by exciting oxygen flowing past the tube and mercury plasma within the tube is electromagnetically pinched in order to increase efficiency of the ozone generator.

BACKGROUND OF THE INVENTION

Ozone generators utilizing mercury plasma tubes are well known. In these ozone generators, a transparent containment tube similar to a conventional fluorescent tube contains a mercury gas that when ionized by an electrical potential, becomes an electrically conductive plasma. This plasma emits ultraviolet light at one wavelength, 185 nanometers, that disassociates diatomic oxygen into atomic oxygen, each atom of which then combines with a molecule of diatomic oxygen to form an ozone molecule (O3). However, the mercury plasma also emits ultraviolet light at a wavelength of 254 nanometers, which tends to break down the ozone molecule, which then reverts back to diatomic oxygen and an atom of free oxygen. Since slightly more ozone is created than destroyed in a flow of oxygen (or air containing oxygen) past the plasma containment tube, the net result is that these type ozone generators typically generate about 500 parts per million of ozone in an airflow of about 1 liter/minute. In addition, the mercury plasma tubes used in ozone generators are operated at much higher power levels than a conventional fluorescent tube, which in turn generates higher operating temperatures of components of the containment tube. Contributing to this, during operation the plasma reaches to the inner walls of the containment tube, where many electrons impinge on the walls and lose energy, which increases losses. Because of heating from the increased power levels and the described losses, mercury plasma containment tubes are typically constructed of quartz, which requires a more expensive fabrication process than a conventional glass tube. Additionally, while high quality quartz readily passes ultraviolet radiation and glass generally blocks ultraviolet radiation, very thin glass tubes could be used where heating of the tube is not great. Such glass tubes would be much less expensive than conventional quartz tubes. Further, the components of the ozone generator holding a conventional quartz containment tube and components immediately surrounding the tube must be of heat resistant materials.

In view of the foregoing, it is one object of the invention to increase efficiency of an ultraviolet light ozone generator. It is another object of the invention to reduce operating temperatures of such an ozone generator. Yet another object of the invention is to reduce operational power requirements of the ozone generator. Other objects of this invention will become apparent upon a reading of the appended specification.

SUMMARY OF THE INVENTION

This invention is a hybrid ozone generator that utilizes ultraviolet light from a cold or hot cathode lamp to produce ozone. An electrical field is disposed around the lamp, the electrical field pumping energy into oxygen flowing past the lamp. In addition, a theta pinch is performed on the plasma in the lamp, causing an increase of radiation from the plasma. These effects together serve to increase efficiency of the ozone generator and allow more ozone to be generated while allowing the plasma containment tube to operate at lower temperatures.

DETAILED DESCRIPTION OF THE DRAWINGS

In a conventional mercury plasma tube used to generate ozone, mercury gas, in conjunction with small amounts of pening gasses such as neon and argon used to initiate the ionization upon energizing the tube, becomes a plasma and conducts electrons from end-to-end and across the width between the inner walls of the lamp. As stated, electrons in the plasma impinge inner surfaces of these walls, heating the walls and contributing to overall losses in the system. In order to increase efficiency of these ozone-generating lamps, Applicant provides an ozone generator of the ultra-violet type wherein the plasma containment lamp or lamps are substantially surrounded by magnetic and electrical fields that causes plasma to be repelled from walls of the lamp and electrons in the plasma to be accelerated. Such fields, when properly oriented, increase luminescence of the mercury plasma in the ultraviolet spectral ranges, thereby causing increased disassociation of diatomic oxygen which in turn promotes formation of ozone. A further boost in efficiency is realized due to the electrical field around the tube exciting diatomic oxygen molecules flowing past the lamp, allowing them to be disassociated more readily by the ultraviolet radiation. Here, when the oxygen molecules are excited to higher energy levels by the 254 wavelength ultraviolet radiation, they begin to be broken down by the 254 ultraviolet wavelength, further increasing efficiency of the lamp. The plasma lamp or lamps of Applicant's invention may be mounted in a generally airtight housing, with a flow of air from an inlet being driven, as by a small compressor, or drawn, as by a venturi device, past the lamp or tubes and out an outlet.

Figure 1:
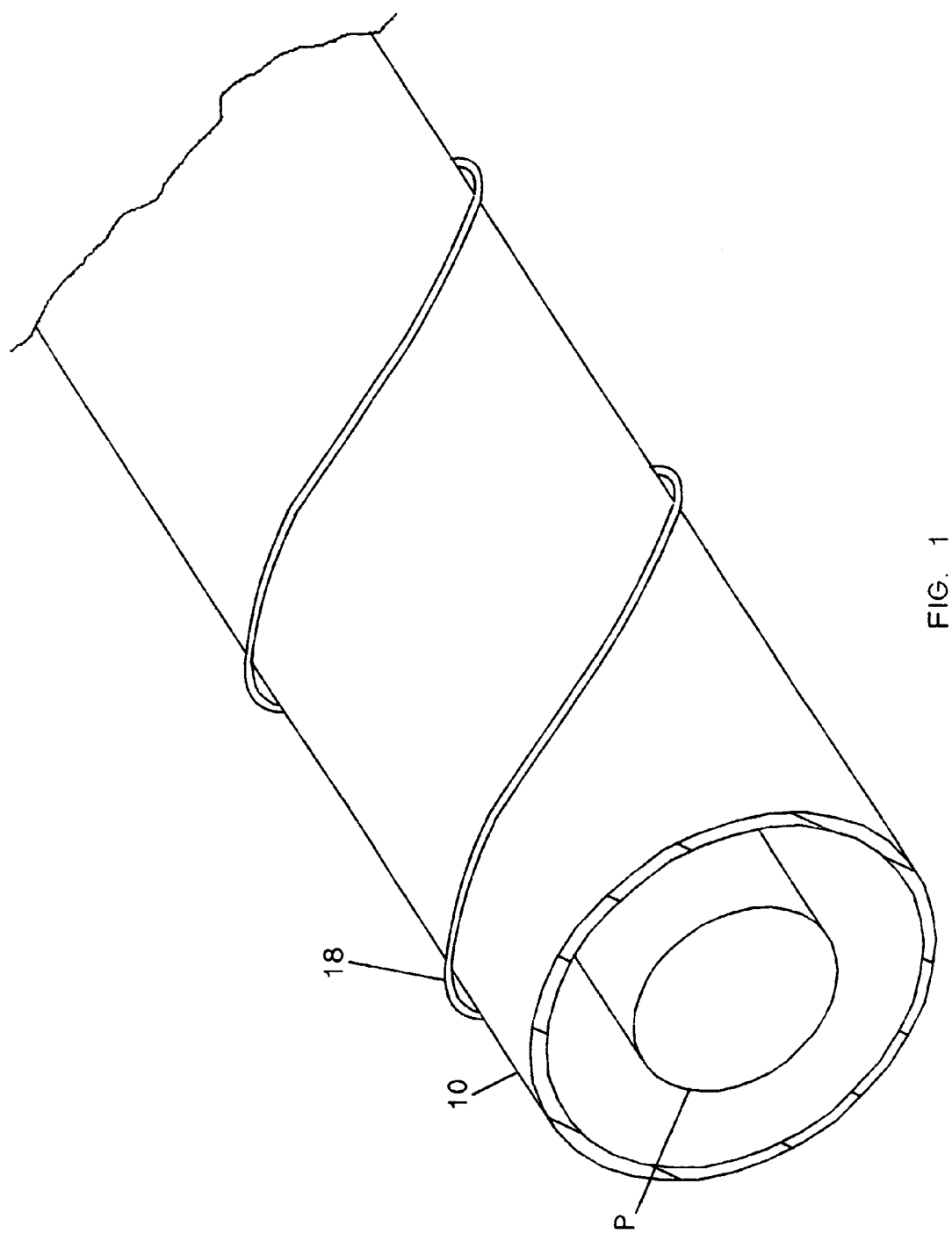
FIG. 1 is a cut-away view of a mercury plasma tube showing details of the instant invention.

In order to accomplish the increased efficiency, and referring to FIG. 1, an electrical conductor 18 is shown wrapped around the exterior of a mercury plasma containment tube 10 of an ultraviolet lamp, which may be either the hot or cold cathode type, shown cut away. A potential is applied to conductor 18 such that at any point in time, the electrical field developed by the conductor pinches the plasma into a smaller volume P than the inner confines of the walls of the containment tube. This type of electrical field is commonly known as a "theta pinch". Such a pinch maintains the plasma within the volume P away from the walls of the containment tube, reducing or eliminating losses due to contact of the plasma with the walls of the tube. In addition, the magnetic field developed by conductor 18 causes electrons in the plasma to be accelerated and spiral about the magnetic field lines therein, causing increased luminescence of the mercury plasma in the ultraviolet spectral ranges.

Figure 2:
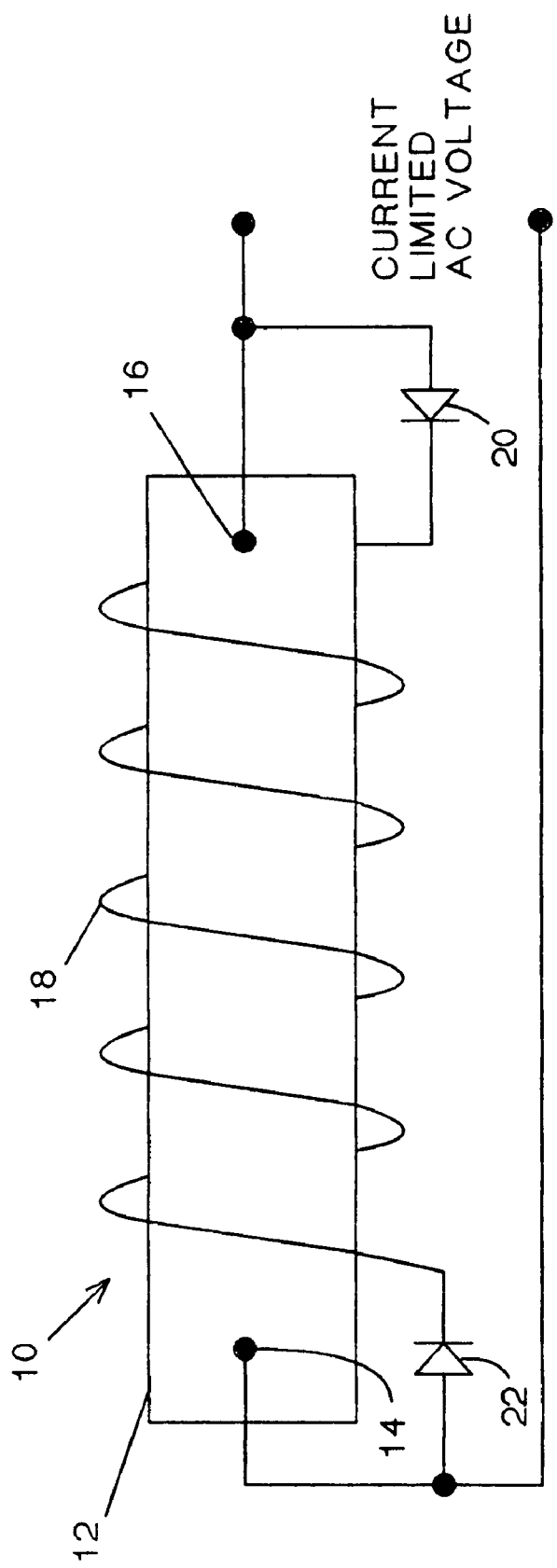
FIG. 2 is a partially schematic, partially block diagram of the instant invention.
Figure 3:
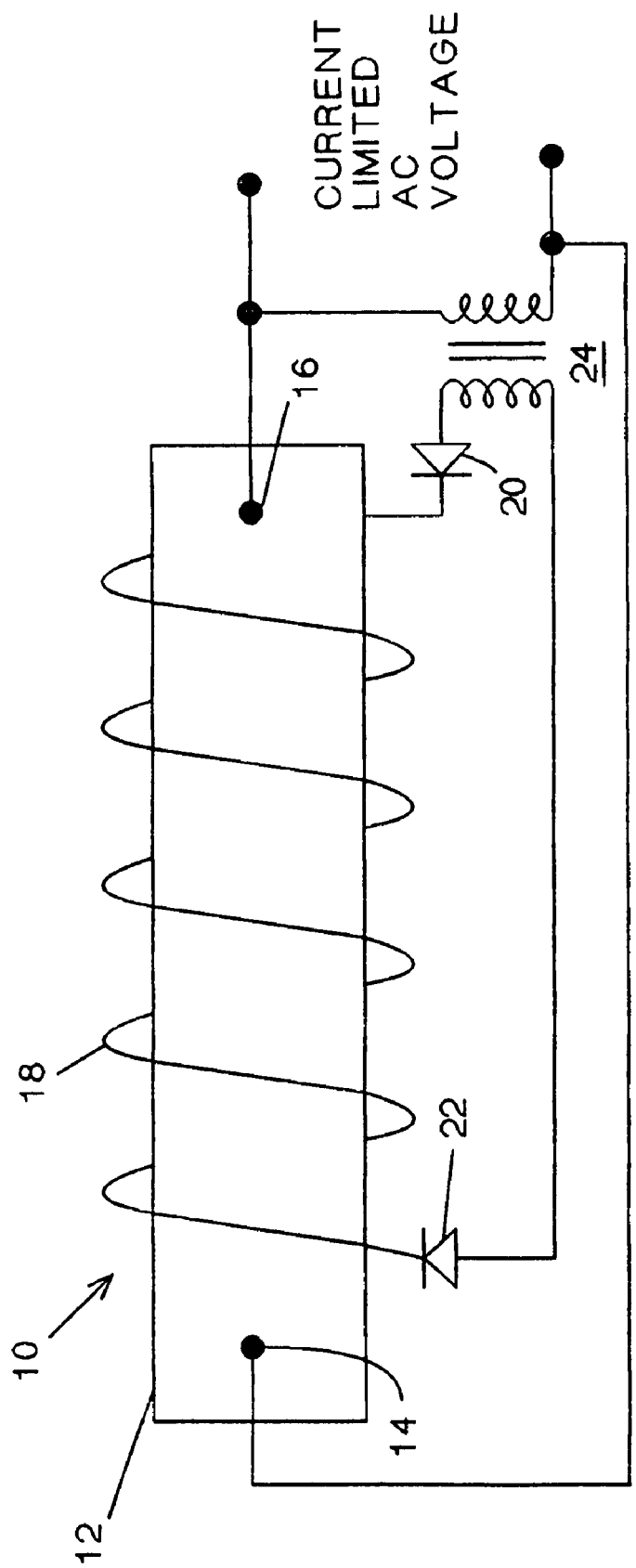
FIG. 3 is a partially schematic, partially block diagram of the instant invention.
Figure 4:
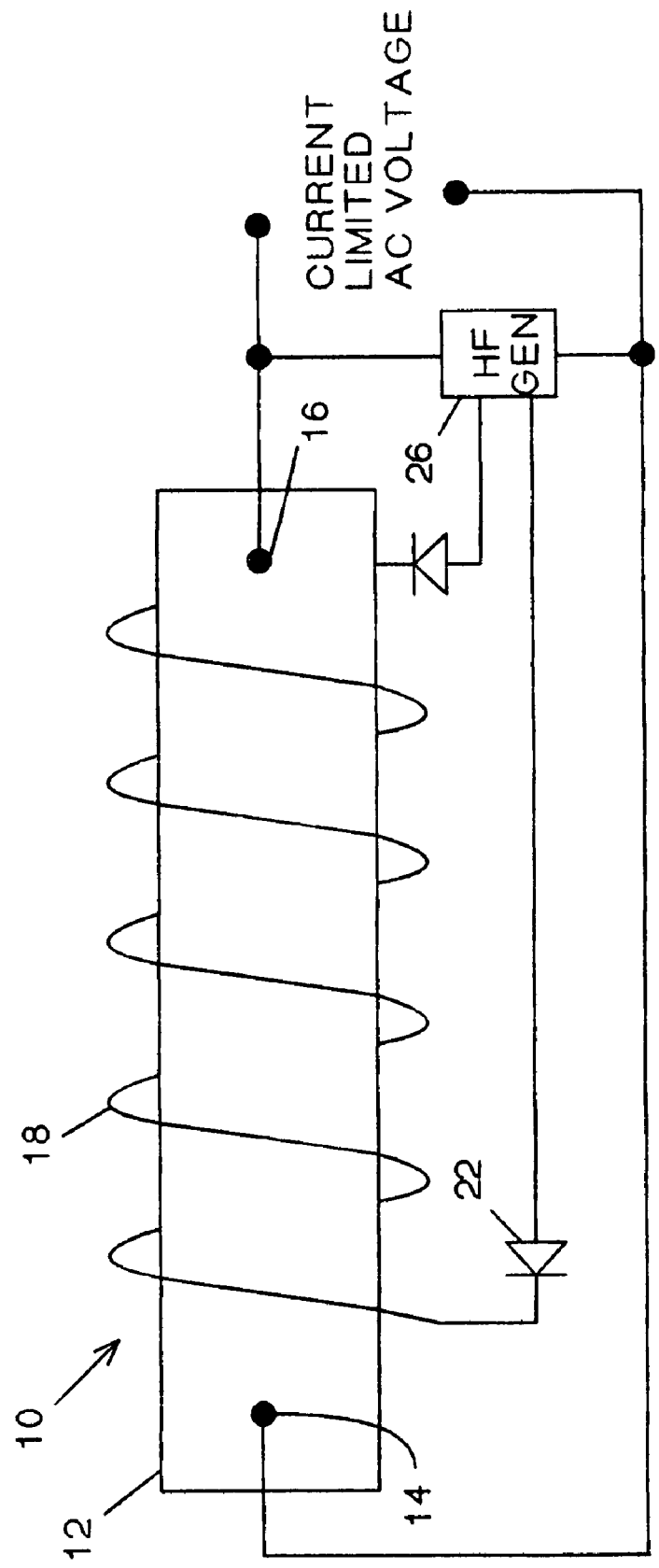
FIG. 4 is a partially schematic, partially block diagram of the instant invention.

Referring now to FIGS. 2, 3 and 4, electrically powered plasma theta pinch lampss of the present invention are shown. The tube portion 10 of these ozone generators may be conventional, electrically powered ultraviolet lamps used in the production of ozone. In these lamps (schematically illustrated), a fused quartz tube or envelope 12 contains an elemental mercury vapor that is the primary source of plasma. While fused quartz tubes are disclosed, where it is discovered that the tubes operate at a substantially lower temperature due to the theta pinch effect, the containment tubes may be constructed of a lower temperature material, such as a thin glass-type material. Here, since electrons are repelled away from the inner walls of the containment tube by the theta pinch, losses from electrons impinging on the inner walls of the tube are minimized or eliminated. A pair of electrodes 14, 16 at opposite ends of the lamp expose the operational, current limited electrical potential to the gasses in the lamp. These electrodes are energized by application of an initially high potential thereto, which may be about 200 volts or so, this initial potential ionizing the pening gasses, which in turn ionizes the mercury vapor, causing current to flow through the mercury plasma. As current begins to flow through the lamp, the electrical potential drops to about 50 volts or so due to the current limited source. As stated, this mercury plasma radiates at spectral frequencies of 185 nanometers and 254 nanometers, with the 254 nanometer emission being approximately 100 times stronger than the 185 nanometer emission. Typically, ozone is generated by the 185 nanometer emission and destroyed by the 254 nanometer emission, meaning that a significant quantity of ozone generated by the lamp is destroyed. In order to overcome this drawback, ultraviolet ozone generators rely on a flow of gas through an area surrounding the lamp in order to exhaust the ozone quickly before it is destroyed.

As described above, Applicant proposes to increase efficiency of these lamps by imposing an electrical field around the plasma containment tube in order to produce a theta pinch within the lamp. In this effect, an electrical field is generated around and in the lamp so as to squeeze the plasma into a smaller volume P along the axis of the lamp. Additionally, the imposed electrical and magnetic fields serve to accelerate electrons moving through the plasma, with these accelerated electrons moving with a tight spiral motion about the magnetic field lines in the containment tube. The resulting additional collisions between the accelerated electrons and mercury ions thus develop higher energy levels, heating the plasma to a higher temperature that otherwise would occur. In turn, this hotter plasma radiates with a greater intensity, converting a greater number of oxygen molecules outside the lamp to ozone.

For developing the theta pinch in the lamp, and as shown in FIGS. 2, 3, and 4, a conductor 18 is wound or otherwise configured around confinement tube 12 of the ultraviolet lamp. This conductor 18 may be a wire, insulated as by Teflon(™). Since the ultraviolet light must escape the lamp in order to generate ozone, there must be gaps in the winding of conductive wire 18. Here, a rate of winding of about 1 to 6 or 8 or so turns of wire per inch of lamp 10 allows sufficient light to escape to increase efficiency of ozone. Of course, where a thinner wire or a transparent conductive material is used, the number of turns per inch may be higher. In FIG. 2, coil 18 is insulated, as by Teflon(™), and is energized by a potential developed by the AC power source, which may be the conventional ballast used to drive the lamp, and rectified by diodes 20, 22. Diodes 20, 22 are poled so that no significant current flows through conductor 18. However, an electrical field is developed around tube 12 with each half cycle of AC power, providing the desired theta pinch. Thus, there are only very minimal additional power requirements to drive conductor 18.

In the embodiment of FIG. 3, a step-up transformer 24 is used to increase the voltage in order to enhance the theta pinch. Transformer 24 may be sized so that the potential is anywhere from slightly higher than the power supply voltage to about 5000 volts or so. Here, higher voltages serve to increase energization of oxygen flowing around the lamp, making the oxygen easier to disassociate.

FIG. 4 shows an embodiment wherein a high frequency generator 26 provides a train of high frequency pulses to diodes 20, 22. These pulses may be of a frequency from about 10 kHz up to a practical limit of 2–3 gHz or so. Particularly in this embodiment, the rapidly pulsed electrical field has more of a pumping effect on oxygen flowing past the containment tube, which as stated, excites electrons in the diatomic oxygen, allowing for easier disassociation of the diatomic molecule. With the electrons of the diatomic oxygen in this excited state, the 254 wavelength of infrared radiation from the plasma, which normally destroys ozone, also begins to disassociate diatomic oxygen, further increasing efficiency of the ozone generator. Where electromagnetic interference is a concern, the ozone generator may be shielded by being enclosed in a metallic housing constructed of or covered by materials conventionally used for electromagnetic shielding purposes.

In any of the above embodiments, where a typical ultraviolet ozone generator develops about 500 parts per million of ozone at 1 liter per minute airflow past the lamp, it has been found that with Applicant's theta pinch, the output of ozone increases to about 700 or so parts per million or more, depending on power, frequency and voltage applied to the winding. In addition, in all the described embodiments, oxygen exposed to the electrical field is excited, and is thus easier to disassociate.

While the instant invention discloses a helical, electrically conductive winding around the containment tube of the ultraviolet lamp in order to induce a magnetic field therein, other ways of providing such a magnetic field may be implemented. For instance, the helical winding may be located within the containment tube. In this instance, it would probably be unnecessary to electrically insulate the winding. Further, magnets or electromagnets disposed for generating a toroidal magnetic field may be used, with the tube centered in the toroidal field. No special or particularized housing would be needed for an ozone generator utilizing Applicant's theta pinch, except as stated in the instance where electromagnetic shield is necessary. Also, power for the theta pinch may be derived from a separate power supply independent from the power supply used to power the ultraviolet tube. Here, the electrical field may be stronger than a field produced by the current limited field used to power the ultraviolet lamp. Further, the electrical fields for the theta pinch, or exciting oxygen may be independent of each other, and where it is discovered that one or the other of the electrical fields is more efficient than the other, the electrical field having the weaker effect may be omitted.

Figure 5:
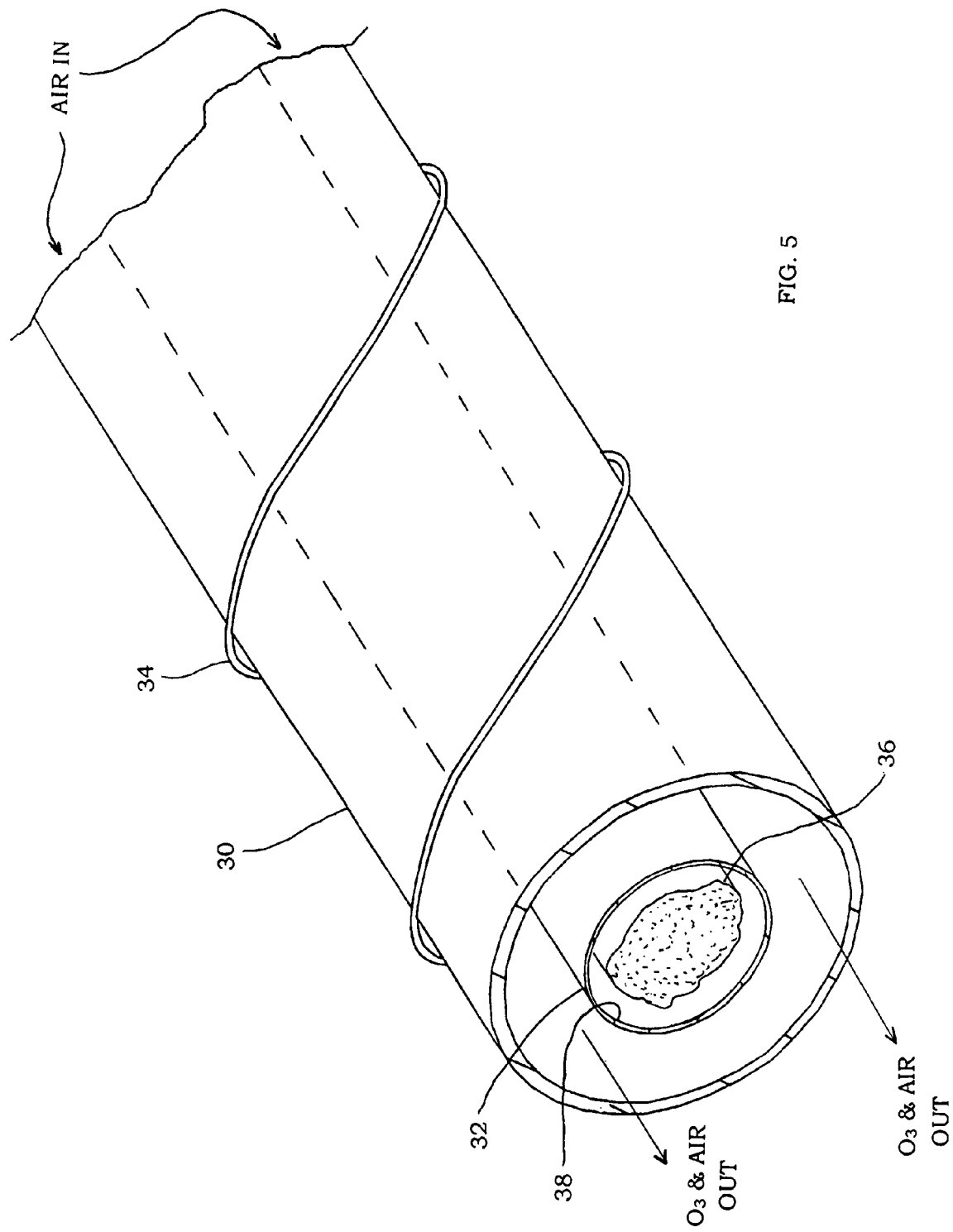
FIG. 5 is a broken-away view of another embodiment of the invention.
Figure 6:
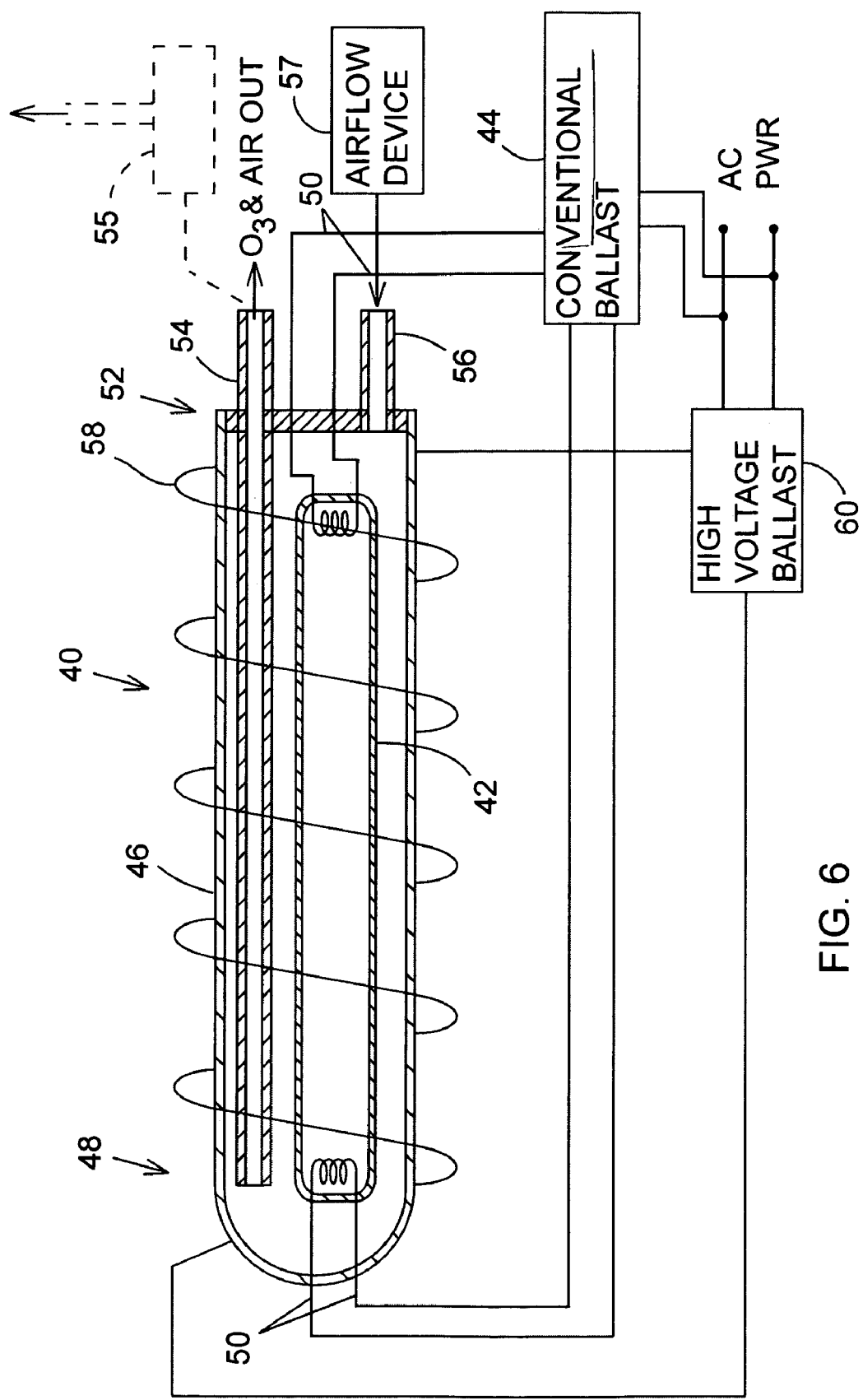
FIG. 6 is a diagrammatic view of one embodiment of the invention as shown in FIG. 5.
Figure 7:
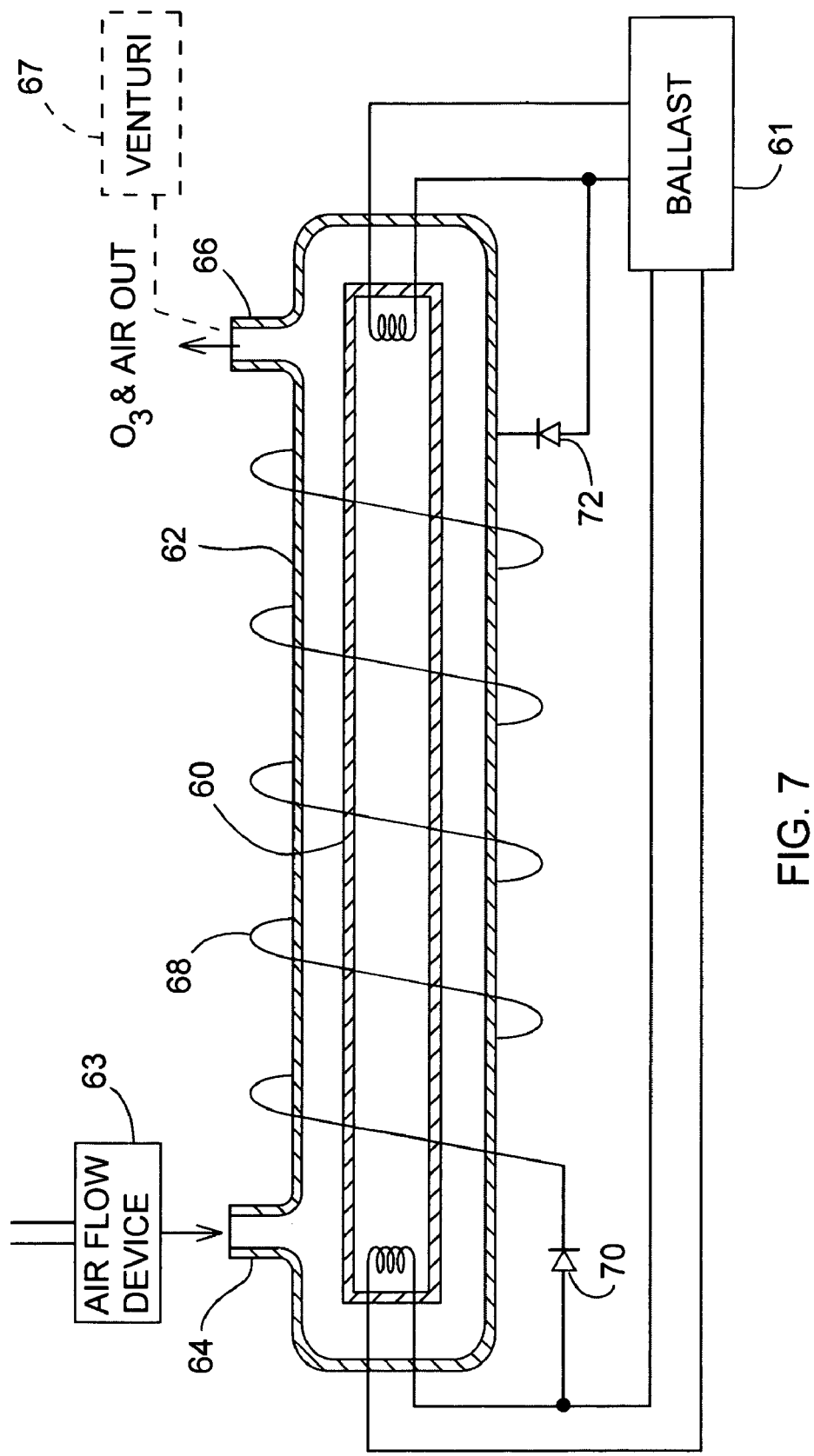
FIG. 7 is a diagrammatic view of another embodiment of the invention as shown in FIG. 5.

In other embodiments of the invention, and as shown in FIGS. 5, 6, and 7, embodiments of the invention are shown that are provided with an outer airtight envelope 30. Such an envelope 30 may be sized so that there is an approximately ¼ inch gap between an inner ultraviolet lamp 32 and inner surfaces of envelope 30. As described above, a wire 34 is wrapped around the outer envelope 30, with an electrical potential applied to the wire. As stated, the wire may be wound at from about 1 to 6–8 turns per inch. The criteria here is not to put so many turns around envelope 30 that a significant amount of ultraviolet light from plasma 36 is blocked by the wire. In addition, surface discharge between individual turns of wire contribute to ozone production, with plasma forming on the dielectric on the insulation of the wire As shown, plasma 36 is driven away from inner sides 38 of lamp 32 by the electrical field developed by the potential in wire 34. Also as stated, wire 34 may be insulated, as by a Teflon™ sheath. Air, which contains oxygen, is driven through sheath 30, where some of the oxygen is converted to ozone.

FIG. 6 shows an ozone generator 40 having an ultraviolet lamp 42 powered by a conventional ballast 44. Lamp 42 is enclosed in a glass vial or tube 46 closed at one end 48, with wires 50 at the closed end 48 passing through the glass of tube 46 and sealed so as to be airtight. Alternately, wires 50 at the left end 48 may be routed inside envelope 46 so that all wires emerge from end 52 of envelope 46. At an opposite end 52 of tube 46 a plug is formed, as by filling the end of the tube with potting compound, sealing the tube in airtight relation. Wires 50 for energizing the right cathode of lamp 42 are sealed by the potting compound. An air inlet 56 extends to a point just within the interior of tube 46 allows air to be pumped into tube 46 by a pump 57. An air outlet is also provided, and which extends as shown generally the length of tube 46 or to a point generally proximate to an end of lamp 42. Outlet 54 may be constructed of a material generally impervious to ultraviolet radiation. A venturi device 55 may be coupled to outlet 54 to draw air through tube 46. With this construction, air entering tube 46 at one end is immediately exposed to ultraviolet radiation, generating ozone, which is then directed to an outlet at an opposite end of tube 46. This has the effect of removing newly-created ozone just after it is generated, preventing breakdown of the ozone by the 254 nm wavelength of ultraviolet light as the ozone/air mixture exits the ozone generator. In addition, this provides an ozone generator wherein the air inlet and air/ozone outlet, and as stated possibly the wires for energizing the ultraviolet lamp, are at the same end of the tube forming the ozone generator.

For forming a theta pinch in ultra violet lamp 42, insulated wire 58 as described is wrapped around tube or vial 46 at a rate of from about 1 to about 6–8 turns per inch. As the wire is somewhat further away from ultraviolet lamp 42 than in the embodiments of FIGS. 1–3, a higher potential, on the order of about 2000–8000 volts AC or DC may be used for a ⅛ to ¼ inch gap between the lamp and inner wall of the tube 46. This would also depend to some extent on the dielectric of the wire and thickness of the tube 46. Such high voltage potential is applied to wire 58 by a high voltage ballast 60, which as stated may be a DC or AC ballast or power supply. The higher intensity field developed by this higher potential applied to wire 58 increases the electrical field within tube 46, which has an increased pumping effect on the molecules of ozone formed therein, forming highly energetic molecules of ozone that are more reactive than lower-energy ozone molecules. These higher energy ozone molecules have greater sanitizing properties and better destroy biofilms such as those that form in plumbing of hot tubs, spas, jetted tubs and the like than lower energy ozone formed by other ozone generators.

In yet another embodiment of the invention as shown in FIG. 7, an ultraviolet lamp 60 is totally enclosed by a glass envelope 62. Lamp 60 is conventionally energized by a ballast 61, which provides a relatively high alternating potential, such as 220 volts or so, to cathodes at each end of lamp 60. An air inlet 64 is provided through which air is provided to the interior of envelope 62, as by a pump 63, and an air outlet 66 is provided through which air mixed with ozone gas exits envelope 62. As stated, a venturi or other suction device 67 may draw air through envelope 62. Insulated wire 68 is wound as described around envelope 62, and is energized by potentials from ballast 61. As described in the foregoing, a high-voltage diode 70 provides a high voltage potential to the turns of wire 68 during one AC cycle from ballast 61, while a second diode 72 provides the high voltage potential to the turns of wire 68 during the other AC cycle of ballast 61. In this embodiment, the envelope 62 is sized slightly larger than ultraviolet tube 60 so that a narrow space, which may be ¼ inch or so, is formed between ultraviolet lamp 60 and the interior of envelope 62.

In the embodiments of FIGS. 5, 6 and 7, the tube or envelope may be constructed of a material, such as quartz, that passes ultraviolet radiation of 254 nm wavelengths, so that the ozone generator may be used to radiate ultraviolet light for sanitizing purposes in addition to those provided by ozone alone. Here, air or water flowed around the sealed tube or envelope is exposed to ultraviolet radiation in addition to ozone, which additionally provides sanitization from ultraviolet light and advanced oxidation reactions, as described below. Further, the tube or envelope may be constructed of a material such as nonconductive quartz, soft glass, PYREX™, FEP (a TEFLON™) silicon rubber or other polymer that passes the 254 nm wavelengths in order to promote advanced oxidation reactions by breaking down the ozone into diatomic oxygen and hydroxyl radicals and a free oxygen atom, which is more reactive than ozone. In addition, the ultraviolet lamps of the embodiments of FIGS. 5, 6 and 7 are supported at each end by a bracket or other ozone-proof material configured to securely hold a respective end of the lamp while securely fitting an interior of the tube or envelope, and that does not block airflow through the outer tube or envelope.

In use, an ozone generator of FIGS. 5, 6 and 7 are fitted into an airflow or waterflow to be sterilized, and the ultraviolet lamp energized. Ozone is provided to the airflow or waterflow, as by a pump or venturi-mixer device, upstream the flow of air or water to be sterilized. As the air or water containing ozone from the ozone generator flows past the ozone generator, ultraviolet radiation additionally sterilizes the air or water and further promotes advanced oxidation reactions and breaks down any residual ozone into diatomic oxygen and a free oxygen atom. The free oxygen and hydroxyl radicals vigorously react with any contaminants in the water.

Having thus described my invention and the manner of its use, it should be apparent that incidental changes may be made thereto that fairly fall within the scope of the following appended claims, wherein I claim:

1. An ozone generator comprising:
  an ultraviolet lamp wherein a plasma is developed between opposed electrical terminals, said plasma emitting wavelengths in the ultraviolet spectrum that disassociate oxygen around the lamp,
  a tube or envelope configured to receive said ultraviolet lamp while providing a relatively small air gap between inner walls of said tube or envelope and said ultraviolet lamp, said tube or envelope having an air inlet and an ozone and air outlet, an airflow generator coupled to said air inlet, a power supply coupled to said ultraviolet lamp, said power supply developing a potential and current source sufficient to develop said plasma, an electrical field generator for imposing an electrical field around said tube or envelope, said electrical field repelling said plasma away from inner walls of said lamp and energizing said oxygen in airflow flowing through said tube or envelope.

2. An ozone generator as set forth in claim 1 wherein said electrical field generator further comprises an electrically conductive winding around said tube or envelope and an electrical potential applied to said winding.

3. An ozone generator as set forth in claim 2 wherein said electrical potential for said winding is derived from said power supply for said ultraviolet lamp.

4. An ozone generator as set forth in claim 3 wherein said electrical field is developed by a potential of an approximate potential as said potential for developing said plasma.

5. An ozone generator as set forth in claim 2 wherein said electrical field is developed by a potential different from said potential for developing said plasma.

6. An ozone generator as set forth in claim 5 wherein said potential energizing said winding is up to approximately 8,000 volts.

7. An ozone generator as set forth in claim 2 further comprising a pulse generator for developing a train of pulses that are applied to said winding.

8. An ozone generator as set forth in claim 7 wherein a frequency of said pulses may be up to a frequency of approximately 3 GHz.

9. An ozone generator as set forth in claim 1 wherein said tube or envelope is generally closed at one end, with a plug in an opposite end of said tube or envelope.

10. An ozone generator as set forth in claim 9 further comprising a first airflow tube extending through said plug into said tube or envelope generally the length of said ultraviolet lamp, and a second airflow tube extending through said plug and terminating just inside said tube or envelope, with said airflow provided to one of said first airflow tube and said second airflow tube.

11. An ozone generator as set forth in claim 1 further comprising a first airflow tube at one end of said tube or envelope and a second airflow tube at an opposite end of said tube or envelope, with said airflow provided to one of said first airflow tube and said second airflow tube.

12. An ozone generator as set forth in claim 1 wherein said tube or envelope is constructed of a material to allow passage of ultraviolet light therethrough.

13. An ozone generator as set forth in claim 1 wherein said tube or envelope is constructed to pass ultraviolet light of a wavelength of about 254 nanometers.

14. An ozone generator as set forth in claim 13 wherein said tube or envelope is constructed of quartz.

15. An ozone generator as set forth in claim 13 wherein said tube or envelope is constructed of a glass material.

16. An ozone generator as set forth in claim 13 wherein said tube or envelope is constructed of a polymer material that passes ultraviolet light.

* * * * *